Figure 1:
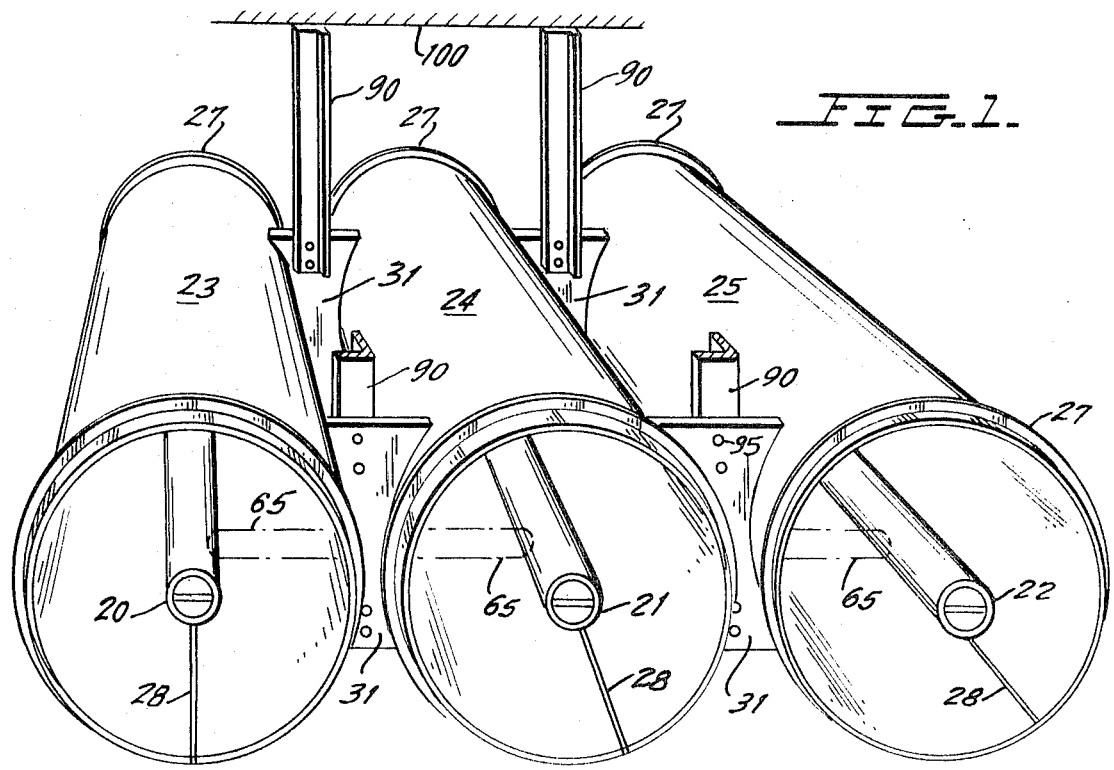

United States Patent

[11] 3,598,898

| | | |
|---|---|---|
| [72] | Inventor | Joseph A. Turgeon<br>Toronto, Ontario, Canada |
| [21] | Appl. No. | 28,389 |
| [22] | Filed | Apr. 14, 1970 |
| [45] | Patented | Aug. 10, 1971 |
| [73] | Assignee | I-T-E Circuit Breaker (Canada) Limited<br>Port Credit, Ontario, Canada |

[54] REINFORCED INTERPHASE SUPPORT ARRANGEMENT FOR ISOLATED PHASE BUS SYSTEM
4 Claims, 4 Drawing Figs.

[52] U.S. Cl. ................................................. 174/99 B,
174/68 B, 307/147
[51] Int. Cl. .................................................. H02g 3/00
[50] Field of Search ........................................... 174/68 B,
99 B; 307/147

[56] References Cited
UNITED STATES PATENTS
3,243,502  3/1966  Turgeon ..................... 174/99 B

*Primary Examiner*—Darrell L. Clay
*Attorney*—Ostrolenk, Faber, Gerb & Soffen

ABSTRACT: An interphase support bracket arrangement for an isolated phase bus system in which a stiffener member is secured in conforming relation to the configuration of the individual bus housings and is provided with a recess to receive an interphase tie. By securing the tie to the stiffener member and by employing a stiffener of thickness comparable to that of the bus housings, previously encountered difficulties in effectively securing the relatively thick tie to the relatively thin housing are eliminated.

PATENTED AUG 10 1971 3,598,898

INVENTOR
JOSEPH A. TURGEON
BY
Ostrolenk, Faber, Gerb & Soffen
ATTORNEYS

3,598,898

REINFORCED INTERPHASE SUPPORT ARRANGEMENT FOR ISOLATED PHASE BUS SYSTEM

My present invention relates to an isolated phase bus system and, more particularly, to a modification of the interphase support arrangement for such a system as described in my U.S. Pat. No. 3,243,502, issued Mar. 29,1966, and assigned to the assignee of this invention.

As described in my patent, the individual phase bus conductors in an isolated phase bus system are each surrounded by a metallic housing, and are physically separated from the other phases of the system by a sufficient distance to provide necessary dielectric protection. In order to provide the necessary mechanical support for the conductors, as well as to provide sufficient rigidity in the event of short circuit occurrences, the prior art provided circular reinforcing members about the outside of each of the phase bus housings. Mounting feet were also employed, attached to each of the circular reinforcing members, to individually secure the housing of each of the phases to a complex arrangement of structural supporting members.

In accordance with my invention set forth in U.S. Pat. No. 3,243,502, the prior art arrangement of mechanically interconnecting each of the phase bus runs to the support arrangement was completely eliminated by directly connecting the individual phase housings to one another by a simple bracket member or tie bar and by then hanging the overall assembly to the supporting structure. As therein set forth, the effect was to connect an integral assembly to a support structure, rather than directly securing each of the individual phase buses of the assembly to a special support. In a preferred embodiment of that system, the interphase support brackets were specified to be made of an electrically conductive material to provide the additional function of electrically interconnecting the housings so that a return current flow would be established therein, substantially equal in magnitude to the bus conductor current. This served to insure a substantially zero magnetic field external to the phase bus housings and to thereby reduce magnetic attractive forces between the individual phases, thus simplifying the manner of supporting the overall assembly.

As will become clear hereinafter, the present invention represents an improvement over that described in my previously issued patent as respects the manner in which the interphase supporting brackets mechanically interconnect the individual phase housings. To be more specific, it will be seen that the interphase supporting bracket connection is one requiring less precision in its fabrication to insure proper fit with respect to the individual housings, as well as one which eliminates any problem presented by having to weld a relatively thick interconnecting bracket to a relatively thin housing. As will be appreciated, in the distribution of electrical energy of large current and voltage magnitudes—as exists for example between the generator and primary transformer windings in a distribution station—the interphase mechanical support would have to be relatively thick in order to provide a return current flow substantially equal in magnitude to the bus conductor current. The provision of a return current path in the phase bus housings, and the advantages that flow therefrom, are set forth in U.S. Pat. No. 3,046,422, issued July 24, 1962 in the name of Roy H. Albright and also assigned to the assignee of this invention.

In one embodiment of the present invention, a stiffening member is secured (as by welding) to the phase bus housing and is provided with a slot or recess to receive the interphase connecting bracket. This support member provides for a relatively easy weld since both it and its associated housing are selected to be similar in thickness. At the same time, the stiffening member is selected of larger surface area than the active portion of the support bracket to aid in spreading the load over the housing. The interphase support or tie is then fitted within the recess and welded to the stiffener to complete the construction.

Hence, it will be seen that my invention is one in which a reinforced interphase support arrangement is provided for directly interconnecting the individual phase bus housings of an isolated phase bus system. The interphase support means combinedly serve in a simple manner to electrically interconnect the phase bus housings and to mount the internally located phase bus support members to their respective housings.

Figure 2:
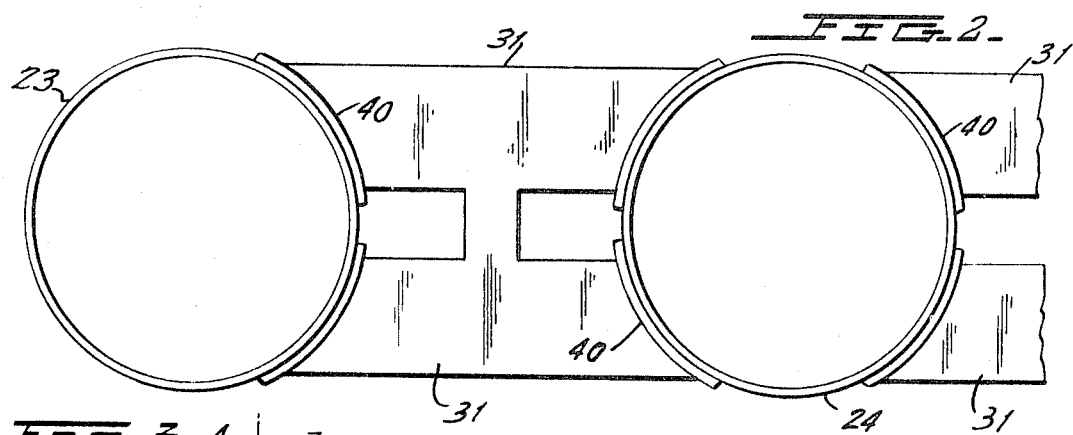
Figure 3:
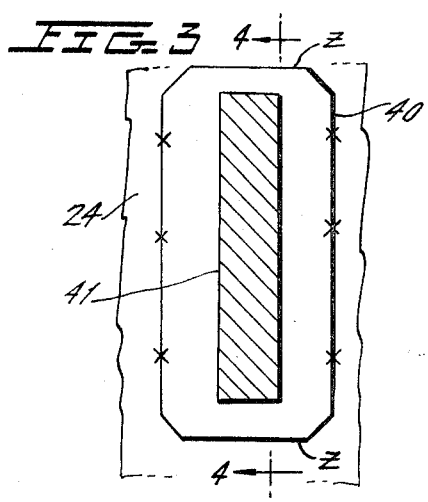
Figure 4:
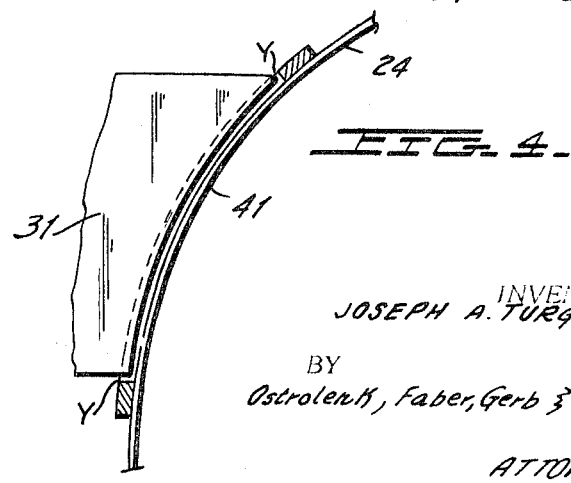

This concept of my invention will be more fully understood from a consideration of the following description taken in connection with the drawings in which:

FIG. 1 is a prospective view of a portion of a three-phase isolated phase bus system of the type described in my U.S. Pat. No. 3,243,502;

FIG. 2 is an end view of a three-phase isolated phase bus system as in FIG. 1, but employing the interphase support bracket arrangement embodying the present invention; and FIGS. 3 and 4 show positions on the interphase bus housings whereat the support bracket of the invention is secured, as an aid in understanding the advantages it affords.

Referring initially to FIG. 1, a three-phase isolated phase bus run is shown as comprising the centrally located bus conductors 20, 21 and 22 which are isolated from one another by metallic housings 23, 24 and 25 respectively. The isolated phase bus run will be understood as being only one portion of a complete bus distribution system typically used to conduct electrical power from one point to another, wherein large power concentrations are involved (as between the generator and transformer of a power distribution station, for example). Thus, the isolated phase bus run shown in FIG. 1 is intended for connection to a successive series of similarly constructed sections, by means of appropriate end fittings 27. Members 65 insulatingly support the conductors 20, 21, 22 within their respective housings.

Each of the bus housings 23, 24 and 25 are metallic cylinders, and may be formed of welded semicylindrical members or from a single rolled member welded as along seam 28. In accordance with the teachings of my aforesaid patent, interphase connecting brackets 31 are located at spaced apart axial locations along the longitudinal extend of each of the housings 23—25, with the number and the spacings of such support brackets being determined by the length of the overall bus run and by the mechanical forces developed in interconnecting the respective housings 23—25. Bracket 31 includes upper and lower arcuate sections at one side thereof, which conform in shape to the cylindrical housing to which that side is secured, and opposed upper and lower arcuate sections at the other side thereof, similarly so conforming in shape. These arcuate sections are fabricated of suitable shape to snugly mate with the outer circumferential regions of the adjacent housings to enable firm mechanical connection therebetween through a plurality of weld joints at spaced locations. The integrally connected assembly of housings 23, 24 and 25 may then be connected to the substation support structures, generally shown as 100, by the simple provision of hanger members 90, bolted, for example, to apertures 95 placed at the end regions of the interphase support brackets 31.

In addition to providing the firm mechanical securement between the housings 23, 24 and 25, the bracket members 31 are formed of a conductive material (e.g. aluminum) to provide good electrical interconnection between the respective housings. When the housings 23, 24 and 25 are electrically grounded, and when an electrical connection as in aforementioned U.S. Pat. No. 3,046,422 is provided, a substantially equal return current flow exists in each of the housings 23—25 to thereby prevent the generation of any substantial magnetic field outside of the volume enclosed by the respective housings. As noted, in my U.S. Pat. No. 3,243,502, the mechanical forces existing between the respective phases will thus be substantially lessened during fault conditions, to permit simplified manners of supporting the central phase conductors 20, 21 and 22 and the arrangement of the interphase support bracket 31.

The arrangement of FIG. 1 as so far described provides a simplified means for mechanically securing the individual phase buses of an isolated phase bus system, with such mechanical securement being provided by a direct connection of the phase bus housings to each other to form an integral unit for securement to the support structure. This arrangement thus avoids the necessity of a structural array of I-beams, as has heretofore been necessary, to individually connect the phase housings. At the same time, the arrangement interconnects the individual phase housings so as to inhibit the extension of magnetic fields external to each housing.

The reinforced interphase support bracket according to the invention, on the other hand, permits further simplification in construction along with a substantial cost and size reduction and a significant reduction in heat loss. In some constructions of an interphase support of the type illustrated in FIG. 1, the support bracket 31 was constructed to be substantially thicker than the housings 23, 24 and 25, since its design was one in which all the current that would normally be distributed around the housing would be carried by the support itself. Hence, considerable difficulty was encountered in fabricating a support to carry such large current, resulting from the need for welding a heavy piece (bracket 31) to a light piece (housing 23). Thus, for instance, the magnitude of heat which would be required in order to weld the thick bracket 31 to the housing 23 would in some instances cause damage to that light unit. Conversely, attempts at welding the heavy interphase tie 31 with a magnitude of heat within safe limits for the housing 23 proved inadequate in that an inferior weld resulted. Furthermore, the considerable precision required in forming the interphase support bracket 31 so that it would snugly fit the housing 23 presented, in some instances, another area where improvement were desirable.

FIGS. 2—4 show an end view of a portion of the isolated phase bus system of FIG. 1 (though not to scale), modified to illustrate the manner by which the interphase support bracket of the present invention aids in distributing the load over the housing while providing ease of welding securement. Basically, these figures illustrate an configuration which a stiffer member 40 is first clamped to the bus housing 23, 24, 25 and then tack welded thereto along the sides thereof, at locations marked X in FIG. 3, for example. These stiffener members 40 are slotted (as at 41) to provide a recess or shoe for receiving the interphase tie 31, and are selected of comparable thickness to the housing so that relatively easy welding between the two is possible. Since the dimensions of these stiffening members 40 are substantially greater than corresponding dimensions of the interphase support bracket 31 inserted fitted within slot 41, the stiffener member 40 also serves to distribute the load presented by the interphase support over a greater surface area of the housing then in the arrangement of my aforesaid patent, as illustrated herein in FIG. 1.

After the interphase support bracket 31 is positioned within the stiffener slot 41, a series of fillet wells are provided around the mating surfaces, as at point Y in the sectional view of FIG. 4. In this respect, it will be noted that the support brackets 31 are preferably shown as being opened at their central regions both to enable easy positioning within the stiffener slots 41 and to provide compensation for thermal differentials that may be present without exerting undue stresses. The precise spacings between the opposed ends of the interphase support bracket 31 preferably corresponds to the minimum spacing compatible with satisfying the system mechanical and electrical requirements so as to provide a compact overall assembly. After the fillet welds are made at Y to secure the interphase bracket 31 to the stiffener 41, other points along the perimeter of the stiffener 41 may be additionally welded to the housing (as at Z) to complete the overall assembly.

The interphase support bracket arrangement of the present invention provides yet another advantage. In prior art constructions of previous interphase supports, much difficulty was encountered in providing a support which always snugly fit and conformed to the configuration of the bus housing. In such instance, it was found that many welds and shims were necessary in order to obtain the desired fit and securement. Besides being time consuming, these added manufacturing steps increased the possibility of damaging the housing, especially in those arrangements where large interphase supports (of the order of one inch thick, for example) were welded to the housings and used to carry the large currents employed. With the present invention, on the other hand, only the stiffening member need be secured to the housing, and since it is of the same order of thickness of the housing, it can be more easily machined and fabricated so as to conform to the outline of the housing itself. In this respect, the stiffening member can be thought of as a shoe to receive the interphase support which, when subsequently welded to the stiffening unit, provides the necessary securement to the individual bus housing.

I claim:
1. In an isolated phase bus system having a plurality of insulatingly supported central bus conductors, each in its own respective housing, the improvement comprising:
   stiffener means of thickness comparable to that of said phase bus housing being fixedly secured thereto along the surface area thereof, said stiffener means having a recess portion;
   and a plurality of one-piece interphase support brackets of thickness greater than that of said stiffener means being fixedly secured thereto along its surface area less than that of said stiffener means;
   said interphase support brackets being secured within corresponding ones of said recess portions of said stiffener means on adjacent individual ones of said phase bus housings mechanically interconnecting said housings, and with said interphase support brackets being formed of conductive material to additionally electrically interconnect said respective housings.

2. The improvement of claim 1 wherein said stiffener means substantially conformed in shape to the configuration of said respective individual phase bus housings so as to mate therewith and are fixedly secured thereto by a first plurality of welds.

3. The improvement of claim 2 wherein said one-piece interphase support brackets are fitted within corresponding recess portions of said stiffener means and secured thereto by a second plurality of welds.

4. An isolated phase bus system comprising, a plurality of individual phase buses in respective spaced-apart relationship over at least a portion of their longitudinal extent; each of said phase buses having a central bus conductor, a cylindrical housing therefor, and an insulator support member mounted intermediate its respective bus conductor and housing; a plurality of stiffener means of thickness comparable to that of said phase bus housing being fixedly secured thereto at intervals along their longitudinal extend with the securement being along the surface area of said stiffener means; recess portions in each of said stiffener means; a plurality of one-piece interphase support brackets of thickness greater than that of said stiffener means being fixedly secured thereto along its surface area less than that of said stiffener means; each of said one-piece interphase support brackets comprising opposing arcuate end portions rigidly fitted within corresponding ones of said recess portions of said stiffener means on adjacent individual ones of said bus housings along the longitudinal extents thereof mechanically interconnecting said housing, and with said interphase support brackets being formed of conductive material to additionally electrically interconnect said respective housings.